(12) United States Patent
Zhou et al.

(10) Patent No.: US 9,100,816 B2
(45) Date of Patent: Aug. 4, 2015

(54) CHARGING METHOD, DEVICE, AND SYSTEM

(75) Inventors: Han Zhou, Shanghai (CN); Wenfu Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 13/547,776

(22) Filed: Jul. 12, 2012

(65) Prior Publication Data

US 2012/0275348 A1    Nov. 1, 2012

Related U.S. Application Data

(63) Continuation of application No. PCT/CN2010/070142, filed on Jan. 12, 2010.

(51) Int. Cl.

| H04L 12/16 | (2006.01) |
|---|---|
| H04W 4/24 | (2009.01) |
| H04L 12/14 | (2006.01) |
| H04L 12/66 | (2006.01) |
| H04M 15/00 | (2006.01) |
| H04L 29/06 | (2006.01) |
| H04W 12/08 | (2009.01) |

(52) U.S. Cl.
CPC ............... *H04W 4/24* (2013.01); *H04L 12/14* (2013.01); *H04L 12/1457* (2013.01); *H04L 12/66* (2013.01); *H04M 15/00* (2013.01); *H04M 15/41* (2013.01); *H04M 15/66* (2013.01); *H04M 15/80* (2013.01); *H04L 63/107* (2013.01); *H04L 63/108* (2013.01); *H04W 12/08* (2013.01)

(58) Field of Classification Search
CPC ..... H04M 15/80; H04M 15/00; H04M 15/66; H04L 12/66; H04L 12/14

USPC ............ 455/405, 406, 48, 435.1, 432.1, 445, 455/456.1; 370/230, 259, 331, 338, 401
See application file for complete search history.

(56) References Cited

U.S. PATENT DOCUMENTS

| 8,442,004 B2 * | 5/2013 | Bi et al. .................. 370/331 |
| 8,570,908 B2 * | 10/2013 | Raleigh .................. 370/259 |

(Continued)

FOREIGN PATENT DOCUMENTS

| CN | 1645805 A | 7/2005 |
| CN | 101127629 A | 2/2008 |

(Continued)

OTHER PUBLICATIONS

3GPP TSG SA WG2 Meeting # 76,TD S2-096671," Network improvements for MTC feature management", dated Nov. 16-20, 2009, 2 pages total.

(Continued)

*Primary Examiner* — Ajay Cattungal
(74) *Attorney, Agent, or Firm* — Leydig, Voit & Mayer, Ltd.

(57) ABSTRACT

The embodiments of the present invention provide a charging method, device and system in the field of communications technologies. The charging method includes: learning that a user equipment accesses a network beyond an applicable condition; and charging the user equipment. The embodiments of the present invention enable the network operator to charge the user equipment for the access to the network beyond the applicable condition, thereby making it convenient for a user to access the network beyond the applicable condition and providing proper technical support for the charging management of the network operator.

12 Claims, 6 Drawing Sheets

(56) References Cited

U.S. PATENT DOCUMENTS

| | | | |
|---|---|---|---|
| 2001/0034704 A1* | 10/2001 | Farhat et al. | 705/39 |
| 2002/0119766 A1* | 8/2002 | Bianconi et al. | 455/406 |
| 2005/0135348 A1* | 6/2005 | Staack | 370/353 |
| 2009/0047951 A1* | 2/2009 | Yeoum et al. | 455/435.1 |
| 2009/0088129 A1* | 4/2009 | Cai et al. | 455/406 |
| 2010/0191575 A1* | 7/2010 | Raleigh | 705/10 |
| 2010/0191576 A1* | 7/2010 | Raleigh | 705/10 |
| 2010/0191613 A1* | 7/2010 | Raleigh | 705/26 |
| 2010/0260141 A1* | 10/2010 | Chowdhury et al. | 370/331 |
| 2011/0075675 A1* | 3/2011 | Koodli et al. | 370/401 |
| 2011/0086610 A1* | 4/2011 | Baldwin et al. | 455/405 |
| 2011/0158090 A1* | 6/2011 | Riley et al. | 370/230 |
| 2011/0159840 A1* | 6/2011 | Cai et al. | 455/406 |
| 2012/0047276 A1* | 2/2012 | Lindquist et al. | 709/228 |

FOREIGN PATENT DOCUMENTS

| | | |
|---|---|---|
| CN | 101534201 A | 9/2009 |
| WO | 2007120598 A2 | 10/2007 |
| WO | 2009111985 A1 | 9/2009 |

OTHER PUBLICATIONS

3GPP TS 22.368 V1.1.1 (Nov. 2009),3rd Generation Partnership Project;Technical Specification Group Services and System Aspects;Service requirements for machine-type communications; Stage 1(Release 10);dated Nov. 2009, 23 pages total.

International search report for International application No. PCT/CN2010/070142, dated Oct. 28, 2010, 4 pages.

Written Opinion issued in corresponding PCT application No. PCT/CN2010/070142, dated Oct. 28, 2010, total 4 pages.

Search report issued in corresponding European patent application No. 10842827.7, dated Dec. 7, 2012, total 11 pages.

3GPP TR 22.868 V2.0.1: "Technical Specification Group Services and System Aspects; Study on Facilitating Machine to Machine Communication in 3GPP Systems; (Release 7)," Jan. 2007, total 15 pages.

3GPP TS 22.368 V1.1.1: "Technical Specification Group Services and System Aspects; Service requirements for machine-type communications; Stage 1 (Release 10)," Nov. 2009, total 23 pages.

3GPP TSG-SA5: "Charging Management in 3GPP; Presentation to the 'Online Charging Forum'," Sep. 7, 2006, total 24 pages.

* cited by examiner

CHARGING METHOD, DEVICE, AND SYSTEM

CROSS-REFERENCE TO RELATED APPLICATIONS

This application is a continuation of International Application No. PCT/CN2010/070142, filed on Jan. 12, 2010, which is hereby incorporated by reference in its entirety.

FIELD OF THE INVENTION

The present invention relates to the field of communications technologies, and in particular, to a charging method, device, and system.

BACKGROUND OF THE INVENTION

The Long Term Evolution (LTE, Long Term Evolution) program developed by the 3GPP defines an architecture of a new mobile communication network, which is known as an evolved packet system (EPS, evolved packet system). Evolved packet systems have two application modes: human to human (H2H, Human to Human) communication application, and machine to machine (M2M, Machine to Machine) communication application (also known as MTC (Machine Type Communication)). The M2M here refers to network communication between one or more network elements without human participation. For example, M2M is applied to traffic control and management, factory monitoring, and remote meter reading.

In M2M applications, multiple M2M terminals that have the same M2M application make up an entirety, which is called a group. A network operator may manage or control a group as an entirety. For example, in the application of remote meter reading, all power meters in a region may make up a group, and the network operator may perform mobility management optimization or access management for the group as an entirety.

In an M2M application, according to the type of the M2M application, different M2M application features (MTC Feature) are defined. For example, a remote meter reading service is characterized by periodic triggering, that is, an M2M user equipment (M2M UE, also known as an MTC device, MTC Device) initiates a service within specific time. The application feature of such M2M applications or M2M terminals may be defined as time controlled (Time Controlled). Some types of M2M terminal devices such as vending machines at fixed locations are characterized by low mobility, that is, the M2M terminals initiate services in a specific location area. The application feature of such M2M applications or M2M terminals may be defined as low mobility (Low Mobility).

In the process of implementing the present invention, the inventor finds that the mobile communication network defined by the 3GPP in the prior art has at least the following problems:

For M2M applications characterized by controlled time or fixed location areas among the M2M applications, the network operator allows the M2M terminals to access the network beyond a time range or location area subscribed (predefined) by the M2M terminals. However, when the M2M terminals access the network beyond a subscribed (predefined) time range or location area and access the network within the subscribed (predefined) time range or location area, the network operator is unable to charge the M2M terminals discriminatively.

SUMMARY OF THE INVENTION

Embodiments of the present invention provide a charging method, device and system to charge a user equipment for network access beyond an applicable condition.

Embodiments of the present invention are implemented through the following technical solutions:

An embodiment of the present invention provides a charging method, including:

learning that a user equipment accesses a network beyond an applicable condition; and charging the user equipment.

An embodiment of the present invention provides an event reporting method, including:

learning that a user equipment accesses a network beyond an applicable condition; and reporting an event to a gateway device so that the gateway device charges the user equipment, where the event includes information indicating that the user equipment accesses the network beyond the applicable condition.

An embodiment of the present invention provides a network device, including:

a learning unit, configured to learn that a user equipment accesses a network beyond an applicable condition; and a charging unit, configured to charge the user equipment.

An embodiment of the present invention provides a mobility management element, including:

a learning unit, configured to learn that a user equipment accesses a network beyond an applicable condition;

an event generating unit, configured to generate an event to be reported; and a reporting unit, configured to report the event to a gateway device so that the gateway device charges the user equipment, where the event includes information indicating that the user equipment accesses the network beyond the applicable condition.

As may be seen from the technical solutions provided here, the embodiments of the present invention enable the network operator to learn that the user equipment accesses the network beyond an applicable condition, and to charge the user equipment for the access to the network beyond the applicable condition, thereby making it convenient for a user to access the network beyond the applicable condition and providing proper technical support for the charging management of the network operator.

DETAILED DESCRIPTION OF THE EMBODIMENTS

The technical solutions in the embodiments of the present invention are to be described clearly and completely in the following with reference to the accompanying drawings. Evidently, the embodiments are some exemplary embodiments of the present invention, and the present invention is not limited to such embodiments. All other embodiments, which may be derived by persons skilled in the art from the embodiments given here without making creative efforts, shall fall within the protection scope of the present invention.

Figure 1:
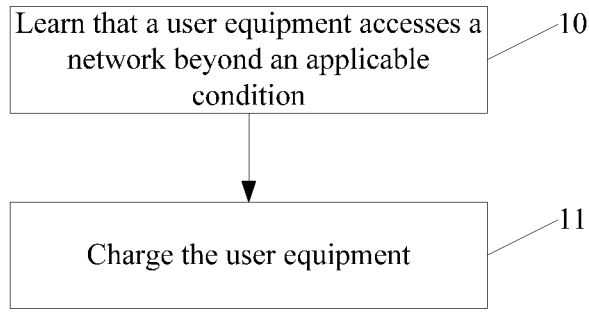
FIG. 1 is a flowchart of a charging method according to an embodiment of the present invention.

An embodiment of the present invention provides a charging method. As shown in FIG. 1, the method includes the following steps:

Step 10: Learn that a user equipment accesses a network beyond an applicable condition.

Step 11: Charge the user equipment.

In the embodiment of the present invention, the executor of step 10 and step 11 may be a gateway device such as a gateway GPRS support node (GGSN, Gateway GPRS Support Node) or a packet data network gateway (PGW, PDN Gateway). The user equipment may be an M2M terminal device.

An applicable condition in the embodiment refers to a subscribed applicable condition in a subscription data, for example, information about the time or location of network access or maximum sent or received data traffic, which is predefined (subscribed) by the user equipment. The applicable condition may also be other constraint condition information, which is not restricted here. The applicable condition may also express the application feature (MTC Feature) of the user. For example, when the applicable condition is time information, the applicable condition may express that the application feature of the user is time controlled (Time Controlled); when the applicable condition is location information, the applicable condition may express that the application feature of the user is low mobility (Low Mobility); when the applicable condition is a maximum sent or received data amount subscribed (predefined) by the user equipment, the applicable condition may express that the application feature of the user is low data usage (Low Data Usage). Understandably, for different M2M applications or user equipments, other various application features may exist, which are not restricted here.

Understandably, the network does not restrict to that the user equipment can access the network within the applicable condition only. The user equipment may also access the network beyond the applicable condition. For example, if the applicable condition is information about subscribed (predefined) time of the user equipment accessing the network (where the time may be expressed as a time segment such as a time segment subscribed in the subscription data), the user equipment may access the network within the time or beyond the time. If the applicable condition is information about a location where the user equipment is allowed to access the network, the user equipment may access the network at the location or beyond the location.

In step 10, "A user equipment accesses a network beyond an applicable condition" means that: the user equipment accesses the network beyond the applicable condition in the subscription data. For example, if the subscription data defines information about the access time subscribed (predefined) by the user equipment, "A user equipment accesses a network beyond an applicable condition" means that the user equipment accesses the network beyond subscribed (predefined) time; if the subscription data defines information about a location subscribed (predefined) by the user equipment, "A user equipment accesses a network beyond an applicable condition" means that the user equipment accesses the network beyond the subscribed (predefined) location area, and so on.

In another embodiment, "A user equipment accesses a network beyond an applicable condition" means that the application feature of the network with respect to an M2M application (or also expressed as an M2M service) or M2M terminal changes from network optimization to no network optimization, or that the application feature of the network with respect to the M2M application or M2M terminal changes from no network optimization to network optimization, that is, the status of the application feature (MTC Feature) of the M2M application or M2M terminal changes from active to inactive, or changes from inactive to active (in other words, the status of the MTC Feature changes from enabled to disabled, or changes from disabled to enabled).

"A user equipment accesses a network beyond an applicable condition" may specifically mean that the user equipment, beyond the applicable condition, initiates an attach procedure, a tracking area update (Tracking Area Update) procedure, a routing area update (Routing Area Update) procedure, a service request (Service Request) procedure, a PDN connectivity procedure, a Packet Data Protocol, PDP, context activation procedure, a resource modification/allocation procedure, a handover procedure, and so on, which are not restricted here. In addition, "A user equipment accesses a network beyond an applicable condition" may also mean that: the user equipment gets attached to (camps on) the network beyond the applicable condition. For example, the user equipment gets attached to the network beyond the subscribed (predefined) time (the user equipment keeps attached to the network beyond the subscribed (predefined) time), or, the user equipment is attached to the network beyond the subscribed (predefined) time and keeps on with the service.

In step 10, the method for learning that the user equipment accesses the network beyond the applicable condition includes the following:

(1) The gateway device learns, according to the obtained applicable condition in the subscription data, that the user equipment accesses the network beyond the applicable condition. The applicable condition may be defined in the HSS (Home Subscriber Server)/HLR (Home Location Register) or SPR (Subscription Profile Repository).

The obtaining the applicable condition in the subscription data includes: receiving the applicable condition that is in the subscription data and sent by a mobility management element or a policy and charging rules function (PCRF, Policy and Charging Rules Function), where the mobility management element or the PCRF obtains the subscribed applicable condition from the subscription data, that is, the subscription data includes the subscribed applicable condition, the mobility management element or the PCRF obtains the subscribed applicable condition from the subscription data and sends it to the gateway device. For example, for the timed-controlled application feature or the time information subscribed (predefined) by the user equipment in the subscription data, the mobility management element or the PCRF obtains information about the network access time subscribed (predefined) by the user equipment from the subscription data, and the mobility management element sends the information about the network access time subscribed (predefined) by the user equipment to the gateway device. After obtaining the information about the network access time subscribed (predefined) by the user equipment, the gateway device learns, according to the time information, that the user equipment accesses the network beyond the applicable condition.

Optionally, the subscription data may define indication information indicating whether the user equipment is allowed to access the network beyond the applicable condition. The mobility management element or the PCRF obtains the indication information from the subscription data, and the mobility management element may send the subscribed applicable condition to the gateway device according to the indication information. For example, if the indication information indicates that the user equipment is allowed to access the network beyond the applicable condition, the mobility management element sends the subscribed applicable condition to the gateway device; if the indication information indicates that the user equipment is not allowed to access the network beyond the applicable condition, the mobility management element rejects the access request of the user equipment. For example, if the indication information indicates that the user equipment is allowed to access the network beyond the subscribed (predefined) access time, the mobility management element sends information about the access time subscribed (predefined) by the user equipment to the gateway device; if the indication information indicates that the user equipment is not allowed to access the network beyond the subscribed (predefined) access time, the mobility management element rejects the access request of the user equipment.

Or, (2) An event reported by the mobility management element is received. The reported includes information indicating that the user equipment accesses the network beyond the applicable condition.

(2a) The mobility management element may generate the reported event according to the subscription data. The subscription data defines at least one of a trigger event and indication information indicating whether the user equipment is allowed to access the network beyond an applicable condition. For example, if the subscribed applicable condition is information about network access time subscribed (predefined) by the user equipment, the subscription data defines a trigger event indicating that the user equipment accesses the network beyond the subscribed (predefined) access time, or the subscription data defines indication information indicating whether the user equipment is allowed to access the network beyond the subscribed (predefined) access time. If the user equipment fulfills the trigger event, the mobility management element reports to the gateway device an event that the user equipment accesses the network beyond the subscribed (predefined) access time. For example, if the trigger event defined in the subscription data is that the user equipment accesses the network beyond the subscribed (predefined) access time, and the user equipment accesses the network beyond the subscribed (predefined) access time, the mobility management element reports to the gateway device the event that the user equipment accesses the network beyond the subscribed (predefined) access time. If the subscription data defines indication information indicating whether the user equipment is allowed to access the network beyond the subscribed (predefined) access time, and the user equipment accesses the network beyond the subscribed (predefined) access time, the mobility management element may, according to the indication information, report to the gateway device the event that the user equipment accesses the network beyond the subscribed (predefined) access time. For example, if the indication information indicates that the user equipment is allowed to access the network beyond the subscribed (predefined) access time, the mobility management element reports the event; if the indication information indicates that the user equipment is not allowed to access the network beyond the subscribed (predefined) access time, the mobility management element rejects the access request of the user equipment.

Or (2b) The mobility management element may generate the reported event according to the trigger event delivered by the gateway device. The trigger event delivered by the gateway device may be configured by the gateway device itself, or the gateway device receives the trigger event which is provided by an application server, or the gateway device receives the trigger event which is provided by the PCRF.

(2b)-1. The configuring the trigger event by the gateway device itself, that is, generating the trigger event by the gateway device itself, includes: configuring, by the gateway device, a corresponding trigger event according to an identifier of an industrial user (MTC User or MTC Server or MTC Subscriber), or a user equipment identifier (such as an IMSI (International Mobile Subscriber Identification Number), MSISDN (Mobile Subscriber International ISDN/PSTN number), or APN (Access Point Name)), or an identifier of a group that the user equipment belongs to (such as an IMSI, MSISDN, APN, or Group ID), or the application feature of the user equipment, or the application feature of the industrial user/group (MTC User or MTC Server or MTC Subscriber or Group) that the user equipment belongs to. For example, if the M2M application or M2M terminal has an application feature of time controlled (Time Controlled), the gateway device configures the trigger event as time expired (Time expired); or, if the M2M application or M2M terminal has an application feature of low mobility (Low Mobility), the gateway device configures the trigger event as location change (Location change); or, if the network expects to learn the change of the MTC Feature status of the M2M application or M2M terminal, such as the change from active (enabled) to inactive (disabled), or change from inactive (disabled) to active (enabled), the gateway device configures the trigger event as MTC Feature status change (MTC Feature status change). For other industrial users or M2M applications or user equipments, other trigger events may be configured, which are not enumerated here exhaustively and are not restricted here.

The gateway device notifies the mobility management element of a configured trigger event. The mobility management element may be a mobility management element (MME, Mobility Management Entity) or a serving GPRS support node (SGSN, Serving GPRS Support Node). For example, the GGSN sends a Create PDP Context Response message (Create PDP Context Response) that carries the trigger event to the SGSN, or the PGW sends a Create Session Response message (Create Session Response) or a Create Bearer Request message (Create Bearer Request) that carries the trigger event to the MME.

(2b)-2. The gateway device receiving the trigger event which is provided by the application server includes: sending, by the M2M application server (MTC Server or MTC User), the trigger event to the gateway device, for example, through a connectivity procedure. The gateway device notifies the mobility management element of the trigger event. In addition, the MTC Server may send the trigger event to the mobility management element directly, for example, through an interface between the MTC Server and the mobility management element.

(2b)-3. The receiving the trigger event which is provided by the PCRF includes: configuring, by the PCRF, the trigger event in a scenario of deploying the policy and charging control (PCC, Policy and Charging Control) dynamically. In an embodiment, the PCRF may configure the corresponding trigger event according to an identifier of an industrial user (MTC User or MTC Server or MTC Subscriber), or a user equipment identifier (such as an IMSI, MSISDN, or APN), or an identifier of a group that the user equipment belongs to (such as an IMSI, MSISDN, APN, or Group ID), or the application feature of the user equipment, or the application feature of the industrial user/group that the user equipment belongs to. The PCRF sends the configured trigger event to the gateway device. For example, the PCRF sends an Indication of IP CAN Session Establishment Acknowledge message (Indication of IP CAN Session Establishment Acknowledge) that carries the trigger event to the gateway device. The gateway device notifies the mobility management element of the trigger event.

As described in (2b)-1 and (2b)-3, if the gateway device or PCRF configures the trigger event according to the application feature of the user equipment, the gateway device or PCRF needs to obtain the application feature of the user equipment. The method for obtaining the application feature of the user equipment according to an embodiment of the present invention includes the following:

1. The subscription data of the user equipment defines the application feature. The mobility management element may obtain the application feature in an attach procedure while obtaining the subscription data, and notify the network device of the application feature in a session management procedure such as a PDP context activation procedure, a PDN connectivity procedure, or a bearer setup procedure.

For example, when the user initiates an attach procedure, the mobility management element initiates a registration procedure to the HLR/HSS. For instance, the mobility management element sends an Update Location Request message (Update Location Request) to the HLR/HSS, and the HLR/HSS returns an Update Location Acknowledge message (Update Location Acknowledge). The Update Location Acknowledge message includes the subscription data of the user equipment, and the subscription data of the user equipment includes the application feature. In a PDP context activation procedure initiated by the user equipment, the SGSN notifies the GGSN of the application feature of the user equipment. For example, the SGSN sends a Create PDP Context Request message (Create PDP Context Request) to notify the GGSN of the application feature of the user equipment. In an attach procedure or PDN connectivity procedure initiated by the user equipment, the MME notifies the PGW of the application feature of the user equipment. For example, the MME sends a Create Session Request message (Create Session Request) to notify the PGW of the application feature of the user equipment. The gateway device may generate a trigger event according to the obtained application feature of the user equipment. For example, the gateway device finds the trigger event among configured trigger events by using the application feature of the user equipment as an index, thereby generating the trigger event of the user equipment.

Optionally, the subscription data may define indication information indicating whether the user equipment is allowed to access the network beyond an applicable condition. The mobility management element obtains the indication information from the subscription data, and sends a Create Session Request message that carries the indication information to the gateway device. The gateway device may generate a trigger event according to the indication information indicating whether the user equipment is allowed to access the network beyond the applicable condition. For example, if the indication information indicates that the user equipment is not allowed to access the network beyond the applicable condition, the gateway device does not generate the trigger event. If the indication information indicates that the user equipment is allowed to access the network or continue using network resources beyond the applicable condition, the gateway device generates the trigger event according to the obtained indication information.

If PCC is deployed dynamically, the gateway device may notify the PCRF of the obtained application feature of the user equipment. For example, the gateway device sends an Indication of IP CAN Session Establishment message (Indication of IP CAN Session Establishment) to notify the PCRF of the application feature of the user equipment. The PCRF may generate the trigger event according to the obtained application feature of the user equipment. The specific method may refer to the method of generating the trigger event by the gateway device. Optionally, if the gateway device obtains indication information indicating whether the user equipment is allowed to access the network beyond the applicable condition, the gateway device may send the indication information to the PCRF, and the PCRF may generate the trigger event according to the indication information indicating whether the user equipment is allowed to access the network beyond the applicable condition. The specific method may refer to the method of generating the trigger event by the gateway device.

2. If PCC is deployed dynamically, a subscription profile repository (SPR, Subscription Profile Repository) may define at least one of the application feature of the user equipment and the indication information as a part of the service subscription data of the user equipment, where the indication information indicates whether the user equipment is allowed to access the network beyond a constraint condition. When the user equipment initiates an attach procedure or a PDN connectivity procedure or a PDP context activation procedure, after the PCRF receives an Indication of IP CAN Session Establishment message (Indication of IP CAN Session Establishment) sent by the gateway device, the PCRF sends a Profile Request message (Profile Request) to the SPR, and the SPR returns a Profile Response message (Profile Response) to the PCRF. The Profile Response message includes the service subscription data of the user equipment, and the service subscription data of the user equipment includes at least one of the application feature of the user equipment and the indication information indicating whether the user equipment is allowed to access the network beyond an applicable condition. From the Indication of IP CAN Session Establishment message, the PCRF may obtain at least one of the user equipment identifier information, APN information, and the identifier information of the group that the user equipment belongs to. After obtaining at least one of the user equipment identifier information, APN information, the identifier information of the group that the user equipment belongs to, and the application feature of the user equipment, the PCRF may generate the trigger event according to the obtained information. In addition, the PCRF may also generate the trigger event according to the obtained information and the indication information indicating whether the user equipment is allowed to access the network beyond an applicable condition. The PCRF sends an Indication of IP CAN Session Establishment Acknowledge message (Indication of IP CAN Session Establishment Acknowledge) to notify the gateway device of the trigger event. The gateway device may send a Create PDP Context Response message (Create PDP Context Response) or a Create Session Response message (Create Session Response) to notify the mobility management element of the trigger event.

Understandably, if PCC is deployed dynamically, the SPR may define the application feature of the user equipment as a part of the service subscription data of the user equipment, and the HLR/HSS may define indication information as a part of the subscription data of the user equipment, where the indication information indicates whether the user equipment is allowed to access the network beyond the constraint condition. The PCRF may generate the trigger event according to the obtained application feature of the user equipment, or according to the application feature of the user equipment and the indication information indicating whether the user equipment is allowed to access the network beyond the applicable condition.

The method for the mobility management element to report the event according to an embodiment of the present invention includes the following:

The mobility management element obtains the trigger event of the user equipment, and learns that the user equipment fulfills the trigger event, and therefore, the mobility management element reports the event to the gateway device, so that the gateway device charges the user equipment for the access to the network beyond the applicable condition. The reported event includes information indicating that the user equipment accesses the network beyond the applicable condition.

The obtaining the trigger event of the user equipment includes: obtaining the trigger event from the gateway device; or, obtaining the trigger event from the subscription data. The specific method is described above and not repeated here.

Optionally, the learning that the user equipment fulfills the trigger event and reporting the event to the gateway device include: learning that the user equipment fulfills the trigger event, and reporting the event to the gateway device according to the indication information in the subscription data indicating whether the user equipment is allowed to access the network beyond the applicable condition. For example, if the indication information indicates that the user equipment is allowed to access the network beyond the applicable condition, the mobility management element reports the event to the gateway device when learning that the user equipment fulfills the trigger event.

The specific implementation may include: if the mobility management element obtains the trigger event, reporting, by the mobility management element, an event to the gateway device when the user equipment fulfills the trigger event, for example, if the mobility management element learns that the user equipment location changes, or if the mobility management element learns that the access time of the user equipment expires or that the user equipment accesses the network beyond the subscribed (predefined) access time, or if the mobility management element learns that the status of the application feature (MTC Feature) of the user equipment changes, for example, from active (enabled) to inactive (disabled) or from inactive (disabled) to active (enabled), where the event obtained by the mobility management element varies according to different trigger events and is not restricted here, and the event reported by the mobility management element may be: the access time of the user equipment expires, or the user equipment accesses the network beyond the subscribed (predefined) access time, or the user equipment location changes, or the status of the application feature (MTC Feature) corresponding to the M2M application of the user equipment changes, for example, from active to inactive or from inactive to active; the event reported by the mobility management element varies according to different trigger events, and is not restricted here.

If PCC is deployed dynamically, optionally, the gateway device may report the obtained event to the PCRF. Further, according to the reported event indicating that the user equipment accesses the network beyond the applicable condition, the PCRF may generate a new charging rule.

In step 11, charging the user equipment refers to collecting (counting) the charging data of the user equipment. The user equipment is charged in one of the following ways:

(1) The gateway device generates a charging rule to charge the user equipment.

The charging rule may be a charging rule generated for the user equipment after it is known that the user equipment accesses the network beyond the applicable condition. For example, the gateway device charges the user equipment by duration before receiving the reported event, but charges the user equipment by traffic after receiving the reported event. The detailed charging rule is not restricted here. The detailed step may be: after receiving the event reported by the mobility management element, the gateway device may modify the charging rule for a corresponding bearer.

(2) The gateway device generates a charging data record (CDR) to charge the user equipment.

The charging data record includes the charging data generated when the user equipment accesses the network beyond the applicable condition. The gateway device collects statistics of the charging data generated when the user equipment accesses the network beyond the applicable condition. The charging data may include the data traffic, or duration, or count of signaling messages, or number of data packets, or other charging data records, which are generated by the user equipment. The content of the charging data is not restricted here. For example, the gateway device collects statistics of the following items generated when the user equipment accesses the network beyond the subscribed (predefined) access time: data traffic, or duration, or count of signaling messages, or number of data packets, and so on. The gateway device may add statistical charging data into the charging data record (CDR).

Further, the charging data record may include the following information:

1. Time information or location information. The time information indicates the time segment in which the user equipment accesses the network, or the time information indicates information about a change time point. (For example, the time information indicates whether the charging data record is generated within or beyond the access time segment subscribed (predefined) by the user. Additionally, the time information may indicate information about a change time point, and indicate that the user equipment changes from within the subscribed (predefined) access time range to beyond the subscribed (predefined) access time range, or changes from beyond the subscribed (predefined) access time range to within the subscribed (predefined) access time range.) The location information indicates information about the location where the user equipment accesses the network. (For example, the location information may indicate whether the charging data record is generated at or beyond the access location subscribed (predefined) by the user.)

2. Indication information for indicating that the user equipment accesses the network beyond the applicable condition. The indication information may include at least one of the following: (a) indicating that the charging data record is generated beyond the applicable condition, for example, generated when the access time of the user equipment expires, or generated when the user equipment accesses the network beyond the subscribed (predefined) access time, or generated when the user equipment location changes, or generated when the status of the application feature (MTC Feature) corresponding to the M2M application of the user equipment changes, for example, from active to inactive or from inactive to active, where the trigger events are not limited to the events described above and are not restricted here;

(b) indicating whether the application feature of the user equipment is active (enabled), for example, an indication is added in the charging data record to indicate whether the MTC Feature is active or inactive.

The charging in the embodiment of the present invention further includes: using different charging rates to charge the user equipment that accesses the network beyond the applicable condition and the user equipment that accesses the network within the applicable condition respectively. For example, a charging center receives a charging data record reported by the gateway device, and may use different charging rates to charge according to the indication information in the charging data record. For example, if the indication identifier indicates that the MTC Feature is active, the charging center enforces a low charging rate; if the indication identifier indicates that the MTC Feature is inactive, the charging center enforces a high charging rate. In addition, after receiving the charging data record reported by the gateway device, the charging center may use different charging rates to charge according to the time information in the charging data record. For example, if the time information indicates that the user equipment accesses the network within the access time subscribed (predefined) by the user equipment, the charging center enforces a low charging rate; if the time information indicates that the user equipment accesses the network beyond the access time subscribed (predefined) by the user equipment, the charging center enforces a high charging rate.

If PCC is deployed dynamically, the gateway device may report the obtained event (the user equipment accesses the network beyond the applicable condition) to the PCRF in step 10. According to the obtained event, the PCRF generates a new charging rule and delivers it to the gateway device. The gateway device charges the user equipment according to an obtained new charging rule. The specific charging rule is not restricted here.

The executor of step 10 and step 11 in the embodiment of the present invention may also be a mobility management element. When learning that the user equipment fulfills the trigger event, the mobility management element may generate a charging data record (CDR). Optionally, the mobility management element may enforce different charging rules. For example, after it is known that the user equipment fulfills the trigger event and before the event is reported, charging is performed according to the count of signaling messages that are initiated by the user equipment, and after the event is reported, charging is performed according to the number of data packets. The specific charging rule is not restricted here. The CDR generated by the mobility management element may include the content of the CDR generated by the gateway device, and the CDR is not described here.

The charging method in the embodiment of the present invention is not only applicable to M2M communication systems, but also applicable to other communication systems such as H2H communication systems.

The embodiment of the present invention enables the network operator to learn the user equipment's access to the network beyond an applicable condition, and to charge the user equipment for the access to the network beyond the applicable condition, thereby making it convenient for the user to access the network beyond the applicable condition and meanwhile providing proper technical support for the charging management of the network operator.

In addition, in the embodiment of the present invention, a separate charging rule or charging data record may be generated for the user equipment which accesses the network or continues using network resources beyond the applicable condition. Therefore, it is convenient for the network operator to discriminatively charge the user equipment that accesses the network beyond the applicable condition, network resources are utilized properly, and the operator's revenue is increased.

To make the present invention comprehensible, the following describes the charging method of the present invention in detail with reference to exemplary embodiments.

Embodiment 1

Figure 2:
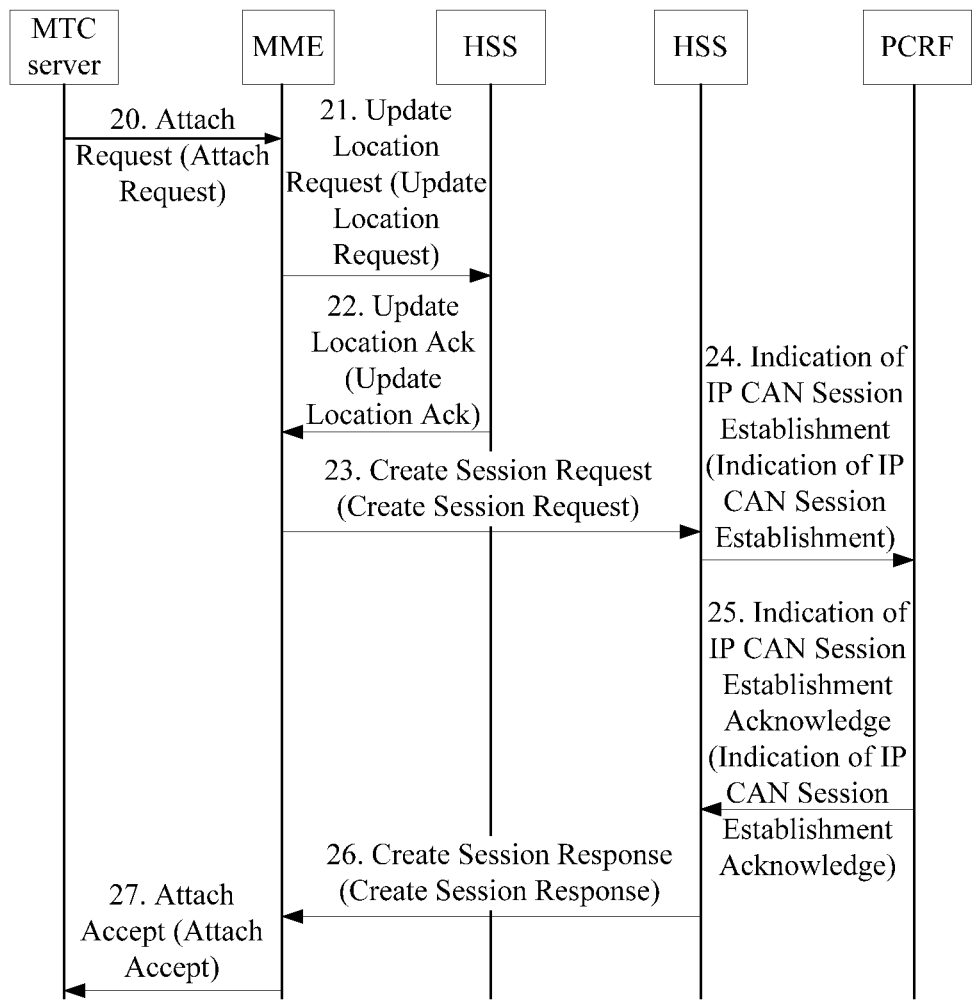
FIG. 2 is a flowchart of a method for delivering a trigger event in an application scenario according to a first embodiment of the present invention.

As shown in FIG. 2, the scenario is: a trigger event is obtained in an E-UTRAN network (Evolved Universal Terrestrial Radio Access Network). The method for obtaining the trigger event includes the following steps:

Step 20: A user equipment sends an Attach Request message to an MME.

Step 21: The MME sends an Update Location Request message (Update Location Request) to an HSS.

Step 22: The HSS returns an Update Location Acknowledge message (Update Location Acknowledge) to the MME.

The Update Location Acknowledge message may include the subscription data of the user equipment. The subscription data of the user equipment includes at least one of the trigger event of the user equipment, the applicable condition of the user equipment, and indication information indicating whether the user equipment is allowed to access the network or continue using network resources beyond the applicable condition. Optionally, the subscription data may include an identifier of a group that the user equipment belongs to. According to the prior art, the subscription data further includes identifier information of the user equipment and APN information.

Step 23: The MME sends a Create Session Request message (Create Session Request) to a PGW.

In a specific embodiment, the method for sending the Create Session Request message is: the MME sends the Create Session Request message to an SGW (Serving Gateway), and the SGW sends it to the PGW.

If the MME obtains at least one of the trigger event of the user equipment, the applicable condition of the user equipment and indication information in step 22, where the indication information indicates whether the user equipment is allowed to access the network beyond the applicable condition, the MME reports an event according to at least one of the trigger event of the user equipment, the applicable condition of the user equipment and the indication information indicating whether the user equipment is allowed to access the network beyond the applicable condition. For example, the MME reports an event to the PGW if the MME learns that the user equipment accesses the network beyond the subscribed (predefined) access time, and, if, the MME obtains, from the subscription data, indication information indicating that the user equipment is allowed to access the network beyond the subscribed (predefined) access time. The event includes information indicating that the user equipment accesses the network beyond the subscribed (predefined) access time.

If, in step 22, the MME obtains at least one of the application feature of the user equipment, the user equipment identifier information, APN information, and the identifier of the group that the user equipment belongs to, and, optionally, the indication information indicating whether the user equipment is allowed to access the network beyond the applicable condition, the MME sends a Create Session Request message to notify the PGW of the obtained information.

The PGW receives the Create Session Request message and generates a trigger event. For example, the PGW generates the trigger event according to the following information in the Create Session Request message: user equipment identifier (IMSI or MSISDN), APN, an identifier of a group that the user equipment belongs to (such as an IMSI, MSISDN, APN, or Group ID), or the application feature of the user equipment, or the application feature of the industrial user/group that the user equipment belongs to.

Optionally, the PGW may generate a trigger event according to the indication information indicating whether the user equipment is allowed to access the network beyond the applicable condition. For example, the PGW generates a corresponding trigger event if the indication information indicates that the user equipment is allowed to access the network beyond the applicable condition. If the indication information indicates that the user equipment is not allowed to access the network beyond the applicable condition, the PGW does not generate the corresponding trigger event.

Step 24: If PCC is deployed dynamically, the PGW sends an Indication of IP CAN Session Establishment message (Indication of IP CAN Session Establishment) to the PCRF.

If, in step 23, the PGW obtains at least one of the user equipment identifier information, APN information, the identifier of the group that the user equipment belongs to, and the application feature of the user equipment, and, optionally, the indication information indicating whether the user equipment is allowed to access the network beyond the applicable condition, the PGW sends the Indication of IP CAN Session Establishment message to notify the PCRF of the obtained information.

The PCRF receives the Create Session Request message and generates a trigger event. The method for generating the trigger event is the same as the method of generating the trigger event by the PGW in step 23. For example, the PCRF generates the trigger event according to the following information in the Create Session Request message: user equipment identifier (IMSI or MSISDN), APN, the identifier of the group that the user equipment belongs to (such as an IMSI, MSISDN, APN, or Group ID), or the application feature of the user equipment, or the application feature of the industrial user/group that the user equipment belongs to. Optionally, the PCRF may generate the trigger event according to the indication information indicating whether the user equipment is allowed to access the network beyond the applicable condition. For example, the PCRF generates the corresponding trigger event if the indication information indicates that the user equipment is allowed to access the network or continue using network resources beyond the applicable condition. If the indication information indicates that the user equipment is not allowed to access the network beyond the applicable condition, the PCRF does not generate the corresponding trigger event.

Step 25: If PCC is deployed dynamically, the PCRF returns an Indication of IP CAN Session Establishment Acknowledge message (Indication of IP CAN Session Establishment Acknowledge) to the PGW.

Optionally, the PCRF sends the Indication of IP CAN Session Establishment Acknowledge message to notify the PGW of the trigger event.

Step 26: The PGW sends a Create Session Response message (Create Session Response) to the MME.

The Create Session Response message is sent by the PGW to the SGW and then sent by the SGW to the MME.

Optionally, the PGW sends the Create Session Response message to notify the MME of the trigger event.

Step 27: The MME returns an Attach Accept message to the user equipment.

Through steps 20-27 above, the gateway device finishes delivering the trigger event to the mobility management element.

If PCC is not deployed dynamically, steps 24-25 above may be omitted.

Embodiment 2

Figure 3:
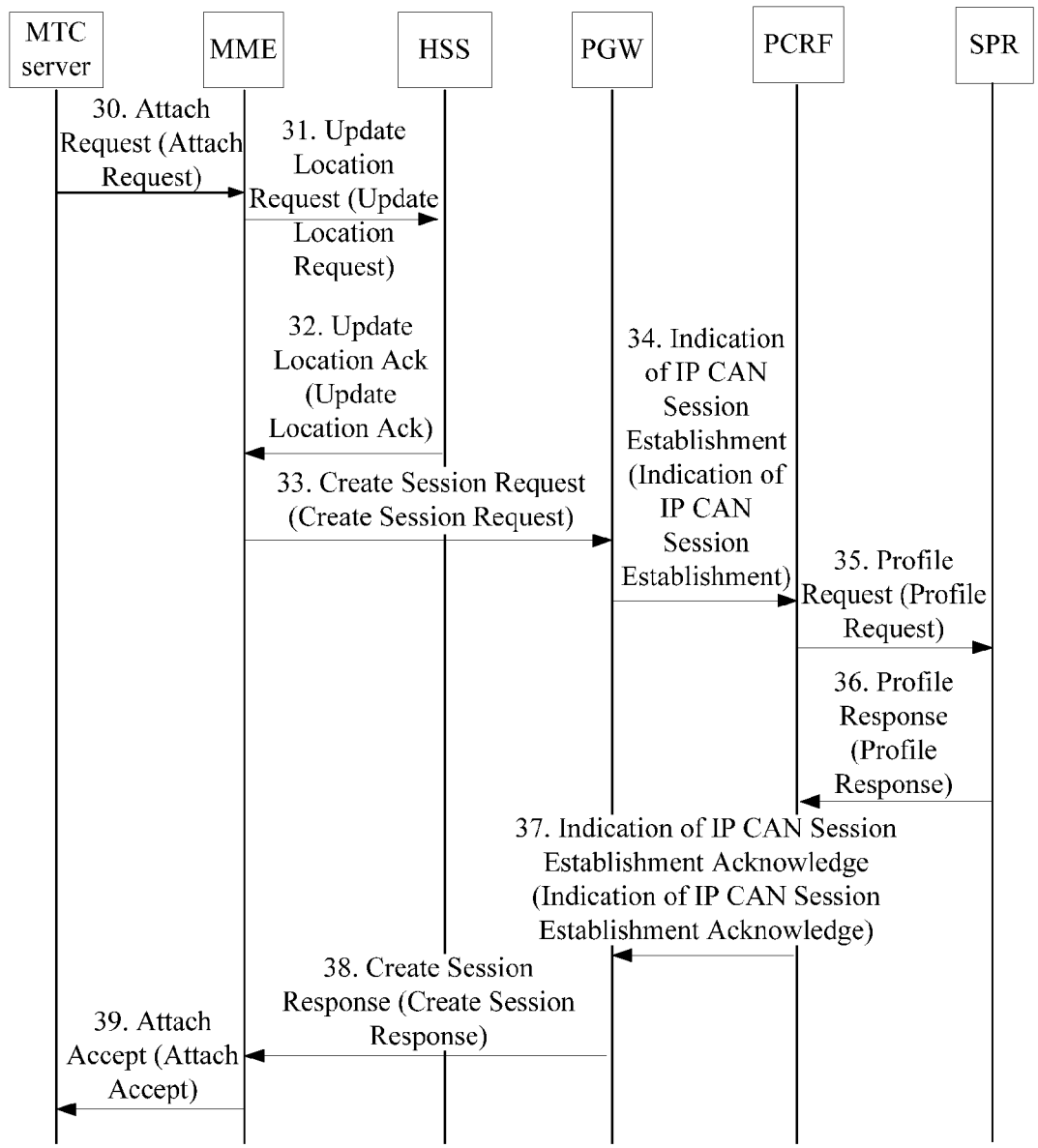
FIG. 3 is a flowchart of a method for delivering a trigger event in another application scenario according to a second embodiment of the present invention.

As shown in FIG. 3, the scenario is: in an E-UTRAN network, PCC is deployed dynamically, an SPR stores at least one of the application feature of a user equipment and indication information indicating whether the user equipment is allowed to access the network beyond an applicable condition, and a gateway device delivers a trigger event to a mobility management element. The delivery process includes the following steps:

Step 30: The user equipment sends an Attach Request message to an MME.

Step 31: The MME sends an Update Location Request message (Update Location Request) to an HSS.

Step 32: The HSS returns an Update Location Acknowledge message (Update Location Acknowledge) to the MME.

Step 33: The MME sends a Create Session Request message (Create Session Request) to a PGW.

In a specific embodiment, the method for sending the Create Session Request message is: the MME sends the Create Session Request message to an SGW, and the SGW sends it to the PGW.

Step 34: The PGW sends an Indication of IP CAN Session Establishment message (Indication of IP CAN Session Establishment) to the PCRF.

The message may include the user equipment identifier information and APN information, and, optionally, include identifier information of the group that the user equipment belongs to.

Step 35: The PCRF sends a Profile Request message (Profile Request) to the SPR.

Step 36: The SPR returns a Profile Response message (Profile Response) to the PCRF.

The Profile Response message includes the service subscription data of the user equipment, and the service subscription data of the user equipment includes at least one of the application feature of the user equipment and the indication information indicating whether the user equipment is allowed to access the network beyond an applicable condition.

The PCRF generates a trigger event. For example, the PCRF generates the trigger event according to the following information in the Indication of IP CAN Session Establishment message: user equipment identifier (IMSI or MSISDN), APN, an identifier of a group that the user equipment belongs to (such as an IMSI, MSISDN, APN, or Group ID), or the application feature of the user equipment, or the application feature of the industrial user/group that the user equipment belongs to.

Optionally, the PCRF may generate the trigger event according to indication information indicating whether the user equipment is allowed to access the network beyond the applicable condition. For example, the PCRF generates the corresponding trigger event if the indication information indicates that the user equipment is allowed to access the network beyond the applicable condition. If the indication information indicates that the user equipment is not allowed to access the network beyond the applicable condition, the PCRF does not generate the corresponding trigger event.

Step 37: The PCRF returns an Indication of IP CAN Session Establishment Acknowledge message (Indication of IP CAN Session Establishment Acknowledge) to the PGW.

The PCRF sends the message to notify the PGW of the trigger event.

Optionally, the PCRF sends the Indication of IP CAN Session Establishment Acknowledge message to notify the PGW of the application feature of the user equipment.

Step 38: The PGW sends a Create Session Response message (Create Session Response) to the MME.

The Create Session Response message is sent by the PGW to the SGW and then sent by the SGW to the MME.

Optionally, the PGW sends the Create Session Response message to notify the MME of the trigger event.

Optionally, the PGW sends the Create Session Response message to notify the MME of the obtained application feature of the user equipment.

Step 39: The MME returns an Attach Accept message to the user equipment.

Through steps 30-39 above, the gateway device PGW finishes delivering the trigger event to the MME.

Understandably, in an E-UTRAN system, the Attach Request in the embodiment above may be replaced with a PDN Connectivity Request, and, if it is the PDN Connectivity Request, the corresponding step 21, step 22, step 31, and step 32 may be omitted and other operations are similar to what is described above.

Embodiment 3

Figure 4:
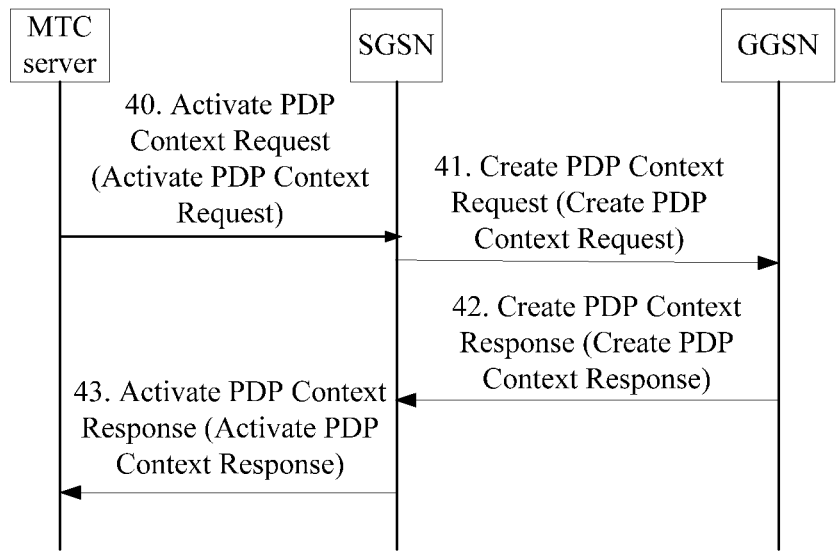
FIG. 4 is a flowchart of a method for delivering a trigger event in still another application scenario according to a third embodiment of the present invention.

As shown in FIG. 4, the scenario is: in a GERAN (GSM/EDGE Radio Access Network)/UTRAN network system, a PDP context activation procedure initiated by the user equipment is used to deliver a trigger event to a mobility management element SGSN. The delivery process includes the following steps:

Step 40: The user equipment sends an Activate PDP Context Request message to an SGSN.

Step 41: The SGSN sends a Create PDP Context Request message to a GGSN.

The Create PDP Context Request message includes the user equipment identifier information and APN information, and optionally, includes an identifier of the group that the user equipment belongs to.

The SGSN may send the Create PDP Context Request message to the GGSN, where the message carries at least one of the application feature of the user equipment and indication information indicating whether the user equipment is allowed to access the network beyond an applicable condition.

Step 42: The GGSN returns a Create PDP Context Response message to the SGSN.

The GGSN generates a trigger event according to configuration information. For example, the GGSN generates the trigger event according to the following information in the Create PDP Context Request message: user equipment identifier (IMSI or MSISDN), APN, an identifier of a group that the user equipment belongs to (such as an IMSI, MSISDN, APN, or Group ID), or the application feature of the user equipment, or the application feature of the industrial user/group that the user equipment belongs to. Optionally, the GGSN may generate the trigger event according to indication information indicating whether the user equipment is allowed to access the network beyond an applicable condition. For example, the GGSN generates the corresponding trigger event if the indication information indicates that the user equipment is allowed to access the network beyond the applicable condition. If the indication information indicates that the user equipment is not allowed to access the network beyond the applicable condition, the GGSN does not generate the corresponding trigger event.

The GGSN sends the message to notify the SGSN of the trigger event.

Step 43: The SGSN sends an Activate PDP Context Response message to the user equipment.

Through steps 40-43 above, the gateway device GGSN finishes delivering the trigger event to the mobility management element SGSN.

Embodiment 4

Figure 5:
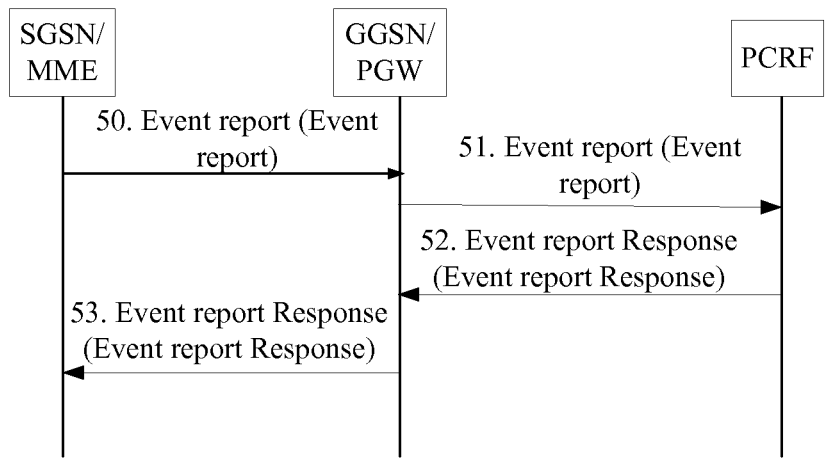
FIG. 5 is a flowchart of an event reporting and charging method according to a fourth embodiment of the present invention.

As shown in FIG. 5, the scenario is: PCC is deployed dynamically; after obtaining a trigger event, a mobility management element reports the event to a gateway device. The reporting process includes the following steps:

Step 50: After learning that the user equipment fulfills the trigger event, an SGSN/MME reports an event to a GGSN/PGW. For example, the MME reports the event to the PGW after learning that the user equipment accesses the network beyond the subscribed (predefined) access time. The event includes information indicating that the user equipment accesses the network beyond the subscribed (predefined) access time.

Step 51: The GGSN/PGW submits the obtained event report to the PCRF.

Step 52: The PCRF returns an event report response message to the GGSN/PGW.

Optionally, the event report response message includes a charging rule generated by the PCRF.

Step 53: The GGSN/PGW returns the event report response message to the SGSN/MME.

The GGSN/PGW charges the user equipment in one of the following ways:

1. The GGSN/PGW may generate a charging data record to charge the user equipment. The charging data record includes the charging data generated when the user equipment accesses the network beyond the applicable condition. The GGSN collects statistics of the charging data generated when the user equipment accesses the network beyond the applicable condition. The charging data may include the data traffic, or duration, or count of signaling messages, or number of data packets, or other charging data records, which are generated by the user equipment. The content of the charging data is not restricted here. For example, the GGSN collects statistics of the following items generated when the user equipment accesses the network beyond the subscribed (predefined) access time: data traffic, or duration, or count of signaling messages, or number of data packets. The gateway device may add the statistical charging data into the charging data record (CDR). The charging data record may further include time information or location information. The time information indicates information about the time when the user equipment accesses the network. For example, the time information may indicate whether the charging data record is generated within or beyond the access time subscribed (predefined) by the user. The location information indicates information about a location where the user equipment accesses the network. For example, the location information may indicate whether the charging data record is generated at or beyond the access location subscribed (predefined) by the user. Optionally, the charging data record may further include indication information indicating that the user equipment accesses the network beyond the applicable condition or indicating whether the application feature of the user equipment is activated.

2. The GGSN/PGW generates a charging rule to charge the user equipment. The charging rule may be a charging rule generated for the user equipment after it is known that the user equipment accesses the network beyond the applicable condition. For example, the GGSN/PGW charges the user equipment by duration before receiving the reported event, but charges the user equipment by traffic after receiving the reported event. The detailed charging rule is not restricted here. The detailed step may be: after receiving the event reported by the mobility management element, the GGSN/PGW may modify the charging rule for the corresponding bearer.

This embodiment does not restrict the method for obtaining the trigger event. The trigger event may be obtained by using the method described in embodiment 1, embodiment 2, or embodiment 3 above.

If PCC is not deployed dynamically, steps 51-52 may be omitted. That is, after receiving the reported event, the GGSN/PGW may generate a charging rule or charging data record, and return an event report response message to the SGSN/MME.

Figure 6:
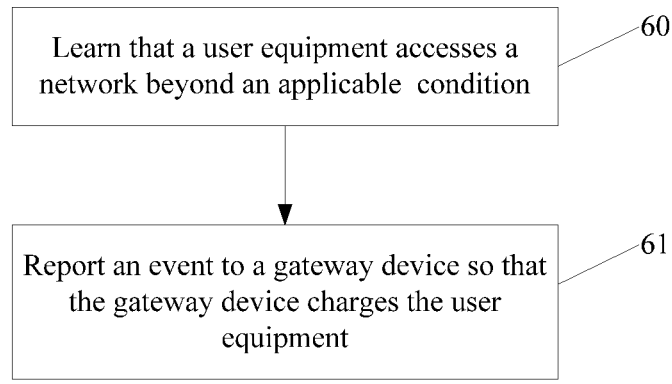
FIG. 6 is a flowchart of an event reporting method according to another embodiment of the present invention.

Another embodiment of the present invention provides an event reporting method. As shown in FIG. 6, the method includes the following steps:

Step 60: Learn that a user equipment accesses a network beyond an applicable condition.

Step 61: Report an event to a gateway device so that the gateway device charges the user equipment.

In step 60, the learning that a user equipment accesses a network beyond an applicable condition includes: generating the reported event according to the trigger event delivered by the gateway device; or, generating the reported event according to subscription data.

The method for generating the reported event according to the trigger event delivered by the gateway device is the same as what is described in the foregoing embodiment, and is not repeated herein.

The method for generating the reported event according to the subscription data is the same as what is described in the foregoing embodiment, and is not repeated here.

The reporting an event to a gateway device in step 61 includes: learning that the user equipment fulfills the trigger event, and reporting an event to the gateway device, where the event includes information indicating that the user equipment accesses the network beyond the applicable condition.

The specific implementation steps may include: reporting, by the mobility management element, an event to the gateway device if the mobility management element learns that the user equipment fulfills a trigger event, for example, if the mobility management element learns that the user equipment location changes, or if the mobility management element learns that the access time of the user equipment expires or that the user equipment accesses the network beyond the subscribed (predefined) access time, or if the mobility management element learns that the status of the application feature (MTC Feature) of the user equipment changes, for example, from active to inactive or from inactive to active, where the event reported by the mobility management element may be: the access time of the user equipment expires, or the user equipment accesses the network beyond the subscribed (predefined) access time, or the user equipment location changes, or the status of the application feature (MTC Feature) of the user equipment changes, for example, from active to inactive or from inactive to active. The event reported by the mobility management element varies according to different trigger events, and is not restricted here.

According to the embodiment of the present invention, the user equipment's access to the network beyond an applicable condition is learned timely and accurately, and is reported to the gateway device so that the gateway device conveniently charges the user equipment for the access to the network beyond the applicable condition, thereby making it convenient for the user to access the network beyond the applicable condition and providing proper technical support for the charging management of the network operator. In addition, the embodiment of the present invention enables charging for the user equipment's access to the network beyond the applicable condition. Therefore, it is convenient for the network operator to discriminatively charge the user equipment that accesses the network beyond the applicable condition, network resources are utilized properly, and the operator's revenue is increased.

Figure 7:
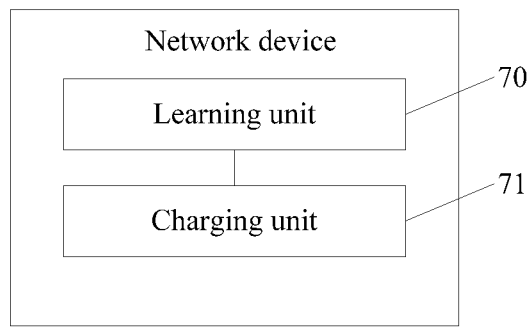
FIG. 7 is a schematic structural diagram of a gateway device according to an embodiment of the present invention.

An embodiment of the present invention provides a network device. As shown in FIG. 7, the network device includes:

a learning unit 70, configured to learn that a user equipment accesses a network beyond an applicable condition; and a charging unit 71, configured to charge the user equipment.

Figure 8:
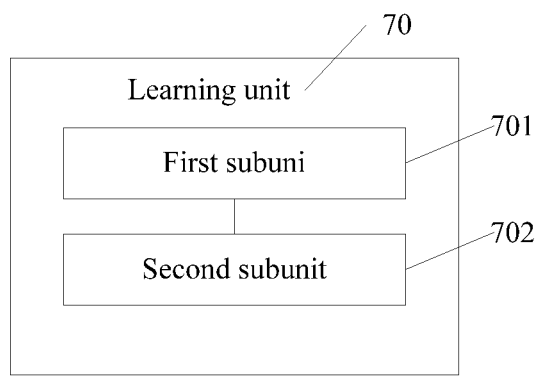
FIG. 8 is a schematic structural diagram of a learning unit in a gateway device according to an embodiment of the present invention.

As shown in FIG. 8, when the network device is a gateway device, the learning unit 70 may further include at least one of following two subunits:

a first subunit 701, configured to learn the user equipment's access to the network beyond the applicable condition according to the applicable condition in the obtained subscription data;

a second subunit 702, configured to receive an event reported by a mobility management element, where the reported event includes information indicating that the user equipment accesses the network beyond the applicable condition.

The learning method of the learning unit 70 is disclosed in the embodiment above and not repeated here.

The charging unit 71 charges the user equipment for the access to the network beyond the applicable condition. The charging method of the charging unit 71 is disclosed in the embodiment above and not repeated here.

Figure 9:
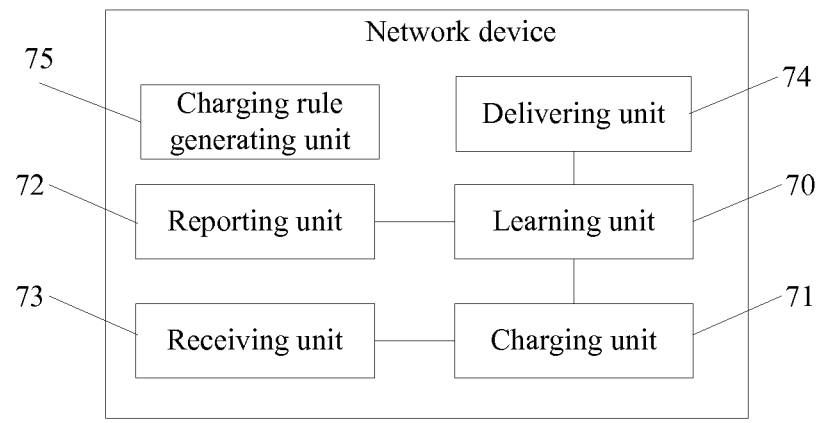
FIG. 9 is a schematic structural diagram of a gateway device according to another embodiment of the present invention.

As shown in FIG. 9, when the network device is a gateway device or mobility management element, the network device may further include one or more of following units:

a reporting unit 72, configured to report information learned by the learning unit 70 to a PCRF, where the information indicates that the user equipment accesses the network beyond the applicable condition;

a receiving unit 73, configured to, according to the information indicating that the user equipment accesses the network beyond the applicable condition, receive a charging rule generated by the PCRF; and, in this case, the charging unit 71 may perform charging according to the charging rule received by the receiving unit 73.

When the network device is a gateway device, the network device may further include a delivering unit 74 configured to deliver a trigger event to the mobility management element, where the delivered trigger event is configured by the gateway device itself, or the gateway device receives the trigger event provided by an application server, or the gateway device receives the trigger event provided by the PCRF. The method for delivering the trigger event is disclosed in the embodiment above and not repeated here.

When the network device is a gateway device or mobility management element, a charging rule generating unit 75 is configured to generate a charging rule that is applicable to the user equipment's access to the network beyond the applicable condition.

The gateway device in the embodiment of the present invention may be, but is not limited to, a GGSN or PGW. The embodiment of the present invention does not restrict the type of the gateway device.

The network device in the embodiment of the present invention can learn the user equipment's access to the network beyond an applicable condition, and charge the user equipment for the access to the network beyond the applicable condition, thereby making it convenient for the user to access the network beyond the applicable condition and providing proper technical support for the charging management of the network operator.

In addition, the network device in the embodiment of the present invention may generate a separate charging rule or charging data record for the user equipment which accesses the network beyond the applicable condition. Therefore, it is convenient for the network operator to discriminatively charge the user equipment that accesses the network beyond the applicable condition.

Figure 10:
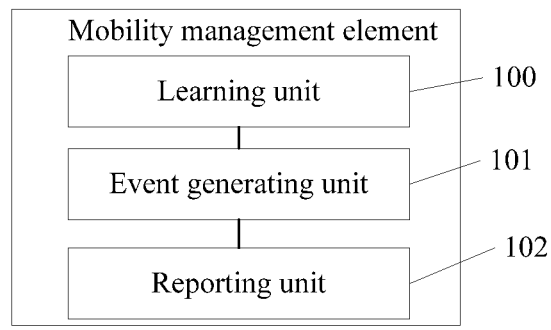
FIG. 10 is a schematic structural diagram of a mobility management element according to an embodiment of the present invention.

An embodiment of the present invention provides a mobility management element. As shown in FIG. 10, the mobility management element includes:

a learning unit 100, configured to learn that a user equipment accesses a network beyond an applicable condition;

an event generating unit 101, configured to generate an event to be reported; and a reporting unit 102, configured to report the event to a gateway device so that the gateway device charges the user equipment, where the event includes information indicating that the user equipment accesses the network beyond the applicable condition.

The learning, by the learning unit 100, that a user equipment accesses a network beyond an applicable condition includes: generating the reported event according to the trigger event delivered by the gateway device; or, generating the reported event according to subscription data. The learning method is disclosed in the embodiment above and not repeated here.

The event generating unit 101 generates the reported event according to the trigger event delivered by the gateway device or according to subscription data.

Examples of the event reported by the reporting unit 102 to the gateway device are: the mobility management element learns that the user equipment location changes, or the mobility management element learns that the access time of the user equipment expires, or the mobility management element learns that the user equipment accesses the network beyond the subscribed (predefined) access time, or the mobility management element learns that the status of the application feature (MTC Feature) of the user equipment changes, for example, from active to inactive or from inactive to active. The event learned by the mobility management element varies according to different trigger events, and is not restricted here. The mobility management element reports an event to the gateway device, where the event may be: the access time of the user equipment expires, or the user equipment accesses the network beyond the subscribed (predefined) access time, or the user equipment location changes, or the status of the application feature (MTC Feature) of the user equipment changes, for example, from active to inactive or from inactive to active. The event reported by the mobility management element varies according to different trigger events, and is not restricted here.

The mobility management element in the embodiment of the present invention may be, but is not limited to, an SGSN or MME. The embodiment of the present invention does not restrict the type of the mobility management element.

The mobility management element in the embodiment of the present invention learns the user equipment's access to the network beyond an applicable condition timely and accurately, and reports to the gateway device so that the gateway device charges the user equipment for the access to the network beyond the applicable condition, thereby making it convenient for the user to access the network or continue using network resources beyond the applicable condition and providing proper technical support for the charging management of the network operator.

Figure 11:
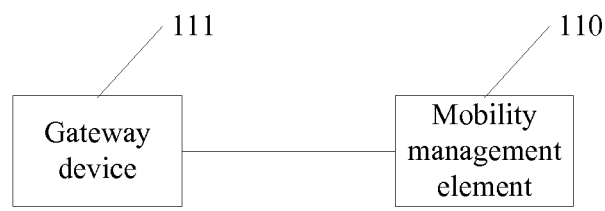
FIG. 11 is a schematic structural diagram of a charging system according to an embodiment of the present invention.

An embodiment of the present invention provides a charging system. As shown in FIG. 11, the system includes a mobility management element 110 and a gateway device 111.

The mobility management element 110 is configured to learn a user equipment's access to a network beyond an applicable condition, and report an event to the gateway device 111. The detailed functions and structure of the mobility management element 110 are disclosed in FIG. 10 and corresponding text description, and are not repeated here.

The gateway device 111 is configured to charge the user equipment for access to the network beyond the applicable condition after learning that the user equipment accesses the network beyond the applicable condition. The gateway device 111 may, by receiving the event reported by the mobility management element 110, learn that the user equipment accesses the network beyond the applicable condition; in addition, the gateway device 111 may, according to an obtained subscribed applicable condition, learn that the user equipment accesses the network beyond the applicable condition. The detailed functions and structure of the gateway device 111 are disclosed in FIG. 7 to FIG. 9 and corresponding text description, and are not repeated here.

Figure 12:
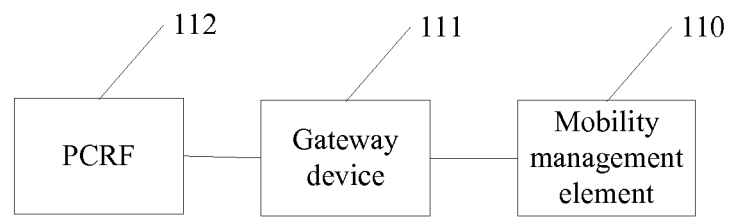
FIG. 12 is a schematic structural diagram of a charging system according to another embodiment of the present invention.

As shown in FIG. 12, if PCC is deployed dynamically, the charging system further includes:

a PCRF 113, configured to deliver a trigger event to the gateway device 111, receive information reported by the gateway device 111, and optionally, deliver a charging rule to the gateway device 111, where the information indicates that the user equipment accesses the network beyond the applicable condition.

According to the embodiment of the present invention, the user equipment's access to the network beyond the applicable condition is learned, and the user equipment is charged for the access to the network beyond the applicable condition, thereby making it convenient for the user to access the network beyond the applicable condition and providing proper technical support for the charging management of the network operator.

To sum up, the embodiments of the present invention enable the network operator to learn the user equipment's access to the network beyond an applicable condition, and to charge the user equipment for the access to the network beyond the applicable condition, thereby making it convenient for the user to access the network beyond the applicable condition and providing proper technical support for the charging management of the network operator.

In addition, according to the embodiments of the present invention, a separate charging rule or charging data record may be generated for the user equipment which accesses the network beyond the applicable condition. Therefore, it is convenient for the network operator to discriminatively charge the user equipment that accesses the network or continues using network resources beyond the applicable condition.

Persons skilled in the art should understand that all or a part of the steps of the method in the embodiments may be implemented by a program instructing relevant hardware. The program may be stored in a computer readable storage medium.

The above descriptions are merely exemplary embodiments of the present invention, but not intended to limit the protection scope of the present invention. Any modifications, variations or replacements that may be easily derived by those skilled in the art shall fall within the protection scope of the present invention. Therefore, the protection scope of the present invention is subject to the appended claims.

We claim:

1. At a gateway device in a mobile communication network, a method of charging a device that accesses the mobile communication network, the method comprising:
    receiving an event reported by a mobility management element, wherein the reported event comprises information indicating that a user equipment accesses the mobile communication network beyond an applicable condition, wherein the applicable condition comprises at least one of: a status of a subscribed application feature of the user equipment being active, and a status of the subscribed application feature of the user equipment being inactive; and
    generating a charging data record to charge the user equipment, wherein the charging data record is applicable to the user equipment's access to the mobile communication network beyond the applicable condition.

2. The method of claim 1, wherein the event reported by the mobility management element and received at the gateway device is generated according to a trigger event delivered by the gateway device.

3. The method of claim 2, wherein the trigger event delivered by the gateway device includes the trigger event configured by the gateway device itself.

4. The method of claim 3, wherein configuring the trigger event by the gateway device comprises:
    configuring the trigger event according to at least one of the following: an identifier of the user equipment; an identifier of an industrial user or group that the user equipment belongs to; an application feature of the user equipment; or an application feature of the industrial user or group that the user equipment belongs to.

5. The method of claim 2, wherein the trigger event delivered by the gateway device includes the trigger event that is received by the gateway device and provided by an application server.

6. The method of claim 2, wherein the trigger event delivered by the gateway device includes the trigger event that is received by the gateway device and provided by a policy and charging rules function (PCRF).

7. The method of claim 1, wherein the event reported by the mobility management element and received at the gateway device is generated according to subscription data.

8. The method of claim 1, wherein the charging data record further comprises:
    indication information indicating that the user equipment accesses the mobile communication network beyond the applicable condition or indicating whether the subscribed application feature of the user equipment is activated.

9. A network device, comprising:
    a learning unit configured to receive an event reported by a mobility management element, wherein the event comprises information indicating that a user equipment accesses a network beyond an applicable condition, wherein the applicable condition comprises at least one of: a status of a subscribed application feature of the user equipment being active, and a status of the subscribed application feature of the user equipment being inactive; and
    a charging unit configured to generate a charging data record to charge the user equipment, wherein the charging data record is applicable to the user equipment's access to the network beyond the applicable condition.

10. The network device of claim 9, further comprising:
    a delivering unit configured to deliver a trigger event to the mobility management element, wherein the trigger event serves to trigger the mobility management element to report the event.

11. A mobility management element, comprising:
    a learning unit configured to learn that a user equipment accesses a network beyond an applicable condition, wherein the applicable condition comprises at least one of: a status of a subscribed application feature of the user equipment being active, and a status of the subscribed application feature of the user equipment being inactive;
    an event generating unit configured to generate an event to be reported; and
    a reporting unit configured to report the event to a gateway device so that the gateway device charges the user equipment, wherein the event comprises information indicating that the user equipment accesses the network beyond the applicable condition.

12. The mobility management element of claim 11, further comprising:
    an event generating unit configured to generate the reported event according to a trigger event delivered by the gateway device or according to subscription data.

* * * * *